US010152147B2

(12) United States Patent  
Choi et al.

(10) Patent No.: US 10,152,147 B2  
(45) Date of Patent: Dec. 11, 2018

(54) TOUCH SENSOR FOR DISPLAY DEVICE

(71) Applicant: LG DISPLAY CO., LTD., Seoul (KR)

(72) Inventors: Howon Choi, Daegu (KR); Jinyeol Kim, Gyeongbuk (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 13/644,865

(22) Filed: Oct. 4, 2012

(65) Prior Publication Data

US 2013/0106747 A1    May 2, 2013

(30) Foreign Application Priority Data

Oct. 27, 2011   (KR) ........................ 10-2011-0110747

(51) Int. Cl.
    *G06F 3/044*    (2006.01)
    *G06F 3/041*    (2006.01)

(52) U.S. Cl.
    CPC .............. *G06F 3/041* (2013.01); *G06F 3/044* (2013.01); *G06F 2203/04111* (2013.01)

(58) Field of Classification Search
    CPC ...... G06F 3/041; G06F 3/0416; G06F 3/0488; G06F 3/044; G06F 3/047; G06F 3/045; G06F 2203/04103; G06F 2203/04107; G06F 2203/04111
    USPC .................................................. 345/173–174
    See application file for complete search history.

(56) References Cited

U.S. PATENT DOCUMENTS

| | | | |
|---|---|---|---|
| 2006/0007171 A1* | 1/2006 | Burdi et al. .................. 345/173 |
| 2007/0003744 A1* | 1/2007 | Kubo .................. B41J 2/14072 |
| | | | 428/209 |
| 2007/0236618 A1* | 10/2007 | Maag ....................... G06F 3/041 |
| | | | 349/12 |
| 2009/0085891 A1* | 4/2009 | Yang ....................... G06F 3/044 |
| | | | 345/174 |
| 2009/0322704 A1* | 12/2009 | Anno ............................ 345/174 |

(Continued)

FOREIGN PATENT DOCUMENTS

| | | |
|---|---|---|
| CN | 101122839 A | 2/2008 |
| CN | 101315590 A | 12/2008 |
| TW | 200915160 A | 4/2009 |

OTHER PUBLICATIONS

3rd Notification of Office Action dated Apr. 11, 2016 from the State Intellectual Property of China in counterpart Chinese Application No. 201210361247.7.

*Primary Examiner* — Kent Chang
*Assistant Examiner* — Sujit Shah
(74) *Attorney, Agent, or Firm* — Morgan, Lewis & Bockius LLP

(57) ABSTRACT

This disclosure relates to touch sensors for display devices having a double routing wire structure. The touch sensor includes a plurality of first touch electrode serials and a plurality of second touch electrode serials electrically insulated from each other; a plurality of first routing wires, each of which is respectively connected with at least one of both ends of each of the plurality of first touch electrode serials; a plurality of second routing wires, each of which is respectively connected with each of the plurality of second touch electrode serials; and at least one of a first jumping wire and a second jumping wire, wherein the first jumping wire connects the first routing wire with a first pad, and the second jumping wire connects the second routing wire with a second pad.

21 Claims, 9 Drawing Sheets

(56) References Cited

U.S. PATENT DOCUMENTS

| | | | |
|---|---|---|---|
| 2010/0085326 A1* | 4/2010 | Anno | 345/174 |
| 2010/0110056 A1* | 5/2010 | Kim | H01R 12/722 |
| | | | 345/211 |
| 2010/0144391 A1* | 6/2010 | Chang et al. | 455/566 |
| 2010/0231531 A1* | 9/2010 | Yang | G06F 3/044 |
| | | | 345/173 |
| 2010/0321326 A1* | 12/2010 | Grunthaner et al. | 345/174 |
| 2011/0007020 A1* | 1/2011 | Hong | G06F 3/0412 |
| | | | 345/174 |
| 2011/0048812 A1* | 3/2011 | Yilmaz | G06F 3/044 |
| | | | 178/18.06 |
| 2011/0050617 A1* | 3/2011 | Murphy et al. | 345/174 |
| 2011/0128240 A1* | 6/2011 | Choi | G02F 1/13 |
| | | | 345/173 |
| 2011/0134055 A1* | 6/2011 | Jung | G06F 3/044 |
| | | | 345/173 |
| 2011/0148809 A1* | 6/2011 | Kanehira et al. | 345/174 |
| 2011/0316803 A1* | 12/2011 | Kim | 345/173 |
| 2012/0274605 A1* | 11/2012 | Anno | 345/174 |
| 2012/0313881 A1* | 12/2012 | Ge et al. | 345/174 |

\* cited by examiner

TOUCH SENSOR FOR DISPLAY DEVICE

This application claims the priority and the benefit of Korea Patent Application No. 10-2011-0110747 on Oct. 27, 2011, the entire contents of which is incorporated herein by reference as if fully set forth herein.

BACKGROUND OF THE DISCLOSURE

Field of the Disclosure

Embodiments of this disclosure relate to touch sensors for display devices, in particular touch sensors for display devices having a double routing wire structure.

Discussion of the Related Art

Touch sensors are installed in display devices such as liquid crystal display (LCD) devices, field emission display (FED) devices, plasma display panels (PDPs), organic light emitting diode display (OLED) devices, and electrophoresis display devices. The touch sensors are used as a kind of input device capable of inputting predetermined information when a user presses or touches a screen of the display device while watching the display device.

The touch sensors used in the display devices may be classified into an add-on type touch sensor, an on-cell type touch sensor, and an integrated type (or in-cell type) touch sensor depending on their structures. The add-on type touch sensor is configured such that a display device and the add-on type touch sensor are individually manufactured and then the add-on type touch sensor is attached to upper substrates of the display devices. The on-cell type touch sensor is configured such that components constituting the on-cell type touch sensor are directly formed on a surface of an upper glass substrate of the display device. The integrated type touch sensor is configured such that it is mounted inside the display device to thereby achieve thin profile of the display device and to increase durability of the display device.

However, because the add-on type touch sensor has the structure in which it is mounted on the display device, an entire thickness of the display device increases. Further, visibility of the display device is reduced because of a brightness reduction of the display device by the thickness increase. Because the on-cell type touch sensor has the structure in which the on-cell type touch sensor is formed on the surface of the upper glass substrate of the display device, the on-cell type touch sensor shares the upper glass substrate with the display device. Therefore, a thickness of the display device using the on-cell type touch sensor is less than that of the display device using the add-on type touch sensor. However, the entire thickness of the display device using the on-cell type touch sensor also increases because of a touch driving electrode layer, a touch sensing electrode layer, and an insulating layer for insulating the touch driving electrode layer and the touch sensing electrode layer, which constitute the on-cell type touch sensor. Further, the number of processes and the manufacturing cost in the on-cell type touch sensor increase.

The integrated type touch sensor can solve the problems generated in the add-on type touch sensor and the on-cell type touch sensor because of advantages of the thin profile and the durability improvement.

Hereinafter, an example of a related art touch sensor applied to an OLED display device will be described in greater detail with reference to FIGS. 1 and 2. FIG. 1 is a plan view illustrating a related art touch sensor, and FIG. 2 is a cross-sectional view partially illustrating the touch sensor integrated type OLED display device in which a touch sensor is applied to an OLED display device.

Referred to FIGS. 1 and 2, the touch sensor integrated type OLED display device includes an OLED display panel DP, a touch sensor TS and a sealant S for adhering the touch sensor TS to the OLED display panel DP.

The OLED display panel DP includes a lower substrate 10 on which thin film transistors (not shown) are formed. The OLED display panel DP also includes an anode electrode 12, an organic light emitting layer 14, a cathode electrode 16 and an organic layer 18 which are sequentially formed on the lower substrate 10. Also, the OLED display panel DP includes touch pads TP' formed on the lower substrate 10. The touch pad TP' is connected with a first pad TP or a second pad RP by a conductor 30. The connection portion 19 is connected with the touch pad TP', and extended from the touch pad TP' to the exterior of the sealant S.

The touch sensor TS includes an upper substrate 20, a plurality of first touch electrode serials Tx formed on the upper substrate 20 and arranged in parallel with a first direction (e.g. x direction), and a plurality of second touch electrode serials Rx arranged in a second direction (e.g. y direction) which crosses the first direction and electrically insulated from the plurality of first touch electrode serials Tx. The plurality of first and second touch electrode serials Tx and Rx function as components of the touch sensor. The touch sensor TS includes a plurality of first routing wires RW1 and a plurality of second routing wires RW2. The plurality of first and second routing wires RW1 and RW2 are formed at outside of a region in which the plurality of first and second touch electrode serials Tx and Rx are formed. Also, the plurality of first routing wires RW1 are respectively connected with the plurality of first touch electrode serials Tx, and the plurality of second routing wires RW2 are respectively connected with the plurality of second touch electrode serials Rx. Also, the touch sensor TS includes a plurality of first pads TP and a plurality of second pads RP formed one edge of the upper substrate 20. The plurality of first pads TP are respectively connected with the plurality of first routing wires RW1, and the plurality of second pads RP are respectively connected with the plurality of second routing wires RW2.

Each of the plurality of first touch electrode serial Tx has a plurality of first electrode patterns 22a, and a plurality of first connection patterns 22b which connect neighboring first electrode patterns 22a with each other. Each of the plurality of second touch electrode serial Rx has a plurality of second electrode patterns 24a, and a plurality of second connection pattern 24b which connect neighboring second electrode patterns 24a with each other. The first connection pattern 22b of the first touch electrode serial Tx crosses over the second connection pattern 24b of the second touch electrode serial Rx to be is electrically insulated from each other.

However, in the touch sensor integrated type OLED devises, entire resistance value of the first and second routing wires RW1 and RW2 is large because the touch sensor has a single routing wire structure in which the first routing wire RW1 is connected with only one end of the first touch electrode serial Tx, and the second routing wire RW2 is connected with only one end of the second touch electrode serial Rx.

On the other hand, the related art touch sensor integrated type LCD device also has the same problems as the related art touch sensor integrated type OLED device because it has a structure in which components of the touch sensor are formed on a color filter substrate or a thin film transistor substrate and routing wires has the single routing wire structure.

In general, touch sensibility of the touch sensor depends on time constant of a resistor-capacitor circuit in the touch sensor. Herein, the time constant (τ) of the resistor-capacitor circuit is equal to the product of the circuit resistance R (ohms) and the circuit capacitance C (farads), i.e. τ=R×C. Thus, the smaller the time constant of the resistor-capacitor circuit is, the better sensibility of the touch sensor is because the time constant is proportional to magnitude of the total resistance of the resistor-capacitor circuit. Accordingly, it is necessary to reduce the magnitude of the resistance for enhancing the sensibility of the touch sensor.

SUMMARY

An object of this disclosure is to provide a touch sensor for a display device comprising a plurality of first touch electrode serials arranged in a first direction; a plurality of second touch electrode serials electrically insulated from the plurality of first touch electrode serials and arranged in a second direction which crosses the first direction; a plurality of first routing wires, each of which is respectively connected with at least one of both ends of each of the plurality of first touch electrode serials to form a first closed-loop or a first open-loop; a plurality of second routing wires, each of which is respectively connected with each of the plurality of second touch electrode serials to form a second closed-loop or a second open-loop; and at least one of a first jumping wire and a second jumping wire, wherein the first jumping wire connects the first routing wire forming the first closed-loop with a first pad, or connects the first routing wires forming the first open-loop and respectively connected to both ends of a same first touch electrode serial with each other, and the second jumping wire connects the second routing wire forming the second closed-loop with a second pad or connects the second routing wires forming the second open-loop with each other.

The first routing wire forming the first closed-loop is connected with the both ends of the first touch electrode serial to form the first closed-loop with the first touch electrode serial; the second routing wire forming the second open-loop has a 2-1 routing wire and a 2-2 routing wire, the 2-1 routing wire having one end connected with one end of the second touch electrode serial and another end connected with the second jumping wire, and the 2-2 routing wire having one end connected with another end of the second touch electrode serial and another end connected with the second pad via the second jumping wire, the first jumping wire connects the first routing forming the first closed-loop with the first pad, and the second jumping wire connects the 2-1 routing wire with the 2-2 routing wire.

Each of the first and second jumping wires has a first width and a second width smaller than the first width, the first width being a width at a region where the first or second jumping wire does not cross over the first routing wire forming the first closed-loop, and the second width being a width at a region where the first or second jumping wire crosses over the first routing wire forming the first closed-loop.

Each of the first routing wire forming the first closed-lop and the 2-1 routing wire has a first width and a second width smaller than the first width, the first width being a width at a region where the first routing wire forming the first closed-loop or the 2-1 routing wire does not cross over the first or second jumping wire, and the second width being a width at a region where the first forming the first closed-loop or 2-1 routing wire crosses over the first or second jumping wire.

The touch sensor further includes a first ground wire between an outmost first routing wire forming the first closed-loop and innermost 2-1 routing wire adjacent to the outmost first routing wire.

a plurality of first jumping wires connect with a plurality of first pads in one-to-one correspondence, and a plurality of second jumping wires connect with a plurality of second pads in one-to-one correspondence The first routing wire forming the first open-loop includes a 1-1 routing wire having one end connected with one end of the first touch electrode serial and another end connected with the first pad, and a 1-2 routing wire having one end connected with another end of the first touch electrode serial and another end connected with the 1-1 routing wire via the first jumping wire, the first jumping wire connects the 1-1 routing wire with the 1-2 routing wire to form a closed-loop with the first touch electrode serial, the second routing wire forming the second open-loop includes a 2-1 routing wire having one end connected with one end of the second touch electrode serial and another end connected with a 2-2 routing wire via the second jumping wire, and the 2-2 routing wire having one end connected with another end of the second touch electrode serial and another end connected with the second pad, and the second jumping wire connects the 2-1 routing wire with the 2-2 routing wire to form a closed-loop with the second touch electrode serial.

The first routing wire forming the first open-loop includes a 1-1 routing wire having one end connected with one end of the first touch electrode serial and another end connected with the first pad, and a 1-2 routing wire having one end connected with another end of the first touch electrode serial and another end connected with the 1-1 routing wire via the first jumping wire, the first jumping wire connects the 1-1 routing wire with the 1-2 routing wire to form a closed loop with the first touch electrode serial, and the second routing wire forming the second open-loop includes a 2-1 routing wire having one end connected with one end of the second touch electrode serial and another end connected with a 2-1 pad, and a 2-2 routing wire having one end connected with another end of the second touch electrode serial and another end connected with a 2-2 pad.

The first routing wire forming the first open-loop includes a 1-1 routing wire having one end connected with one end of the first touch electrode serial and another end connected with a 1-1 pad, and a 1-2 routing wire having one end connected with another end of the first touch electrode serial, the second routing wire forming the second open-loop includes 2-1 routing wires and 2-2 routing wires, a part of the 2-1 routing wires having one end correspondingly connected with one end of a part of the second touch electrode serials and another end connected with a second pad, a remaining part of the 2-1 routing wires having one end correspondingly connected with one end of a remaining part of the second touch electrode serial, a part of the 2-2 routing wires having one end correspondingly connected with another end of the part the second touch electrode serial, and a remaining part of the 2-2 routing wires having one end correspondingly connected with another end of the remaining part of the second touch electrode serials and another end connected with a second pad the second jumping wire connects the 2-1 routing wire with the 2-2 routing wire to form a closed loop with the second touch electrode serial.

BRIEF DESCRIPTION OF THE DRAWINGS

The accompanying drawings, which are included to provide a further understanding of this disclosure and are incorporated in and constitute a part of this specification, illustrate implementations of this disclosure and together with the description serve to explain the principles of the disclosure. In the drawings.

DETAILED DESCRIPTION

Figure 1:
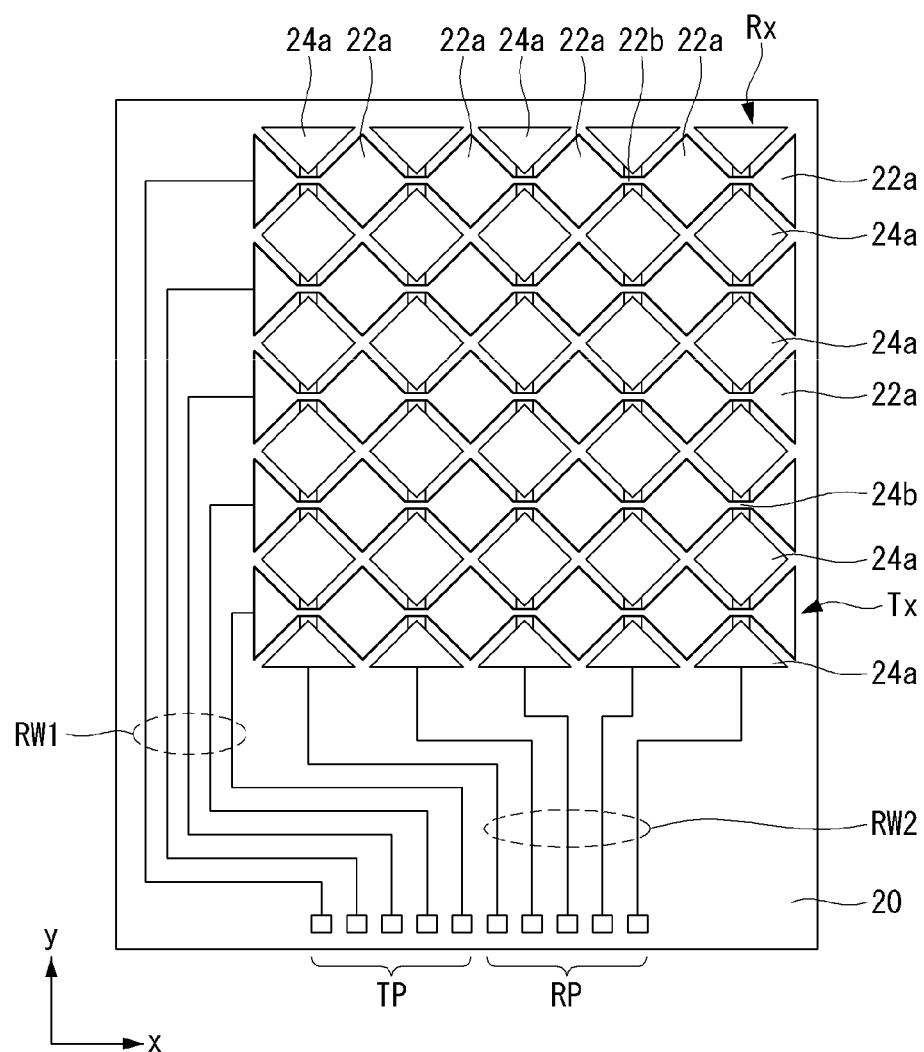
FIG. 1 is a plan view illustrating a related art touch sensor.
Figure 2:
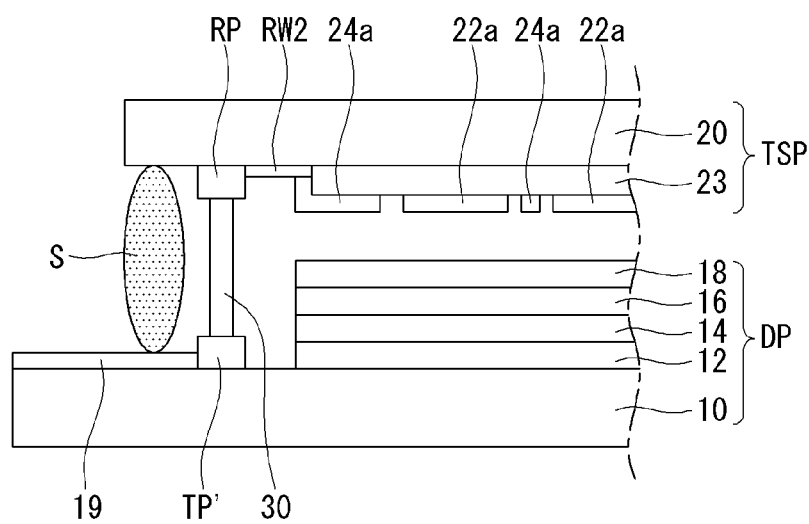
FIG. 2 is a right side cross-sectional view partially illustrating the touch sensor integrated type OLED display device in which a touch sensor shown in FIG. 1 is applied to an OLED display device.

Hereinafter, examples of various embodiments will be described in detail with reference to drawings. Like reference numerals designate like elements throughout the specification of this disclosure.

Figure 3:
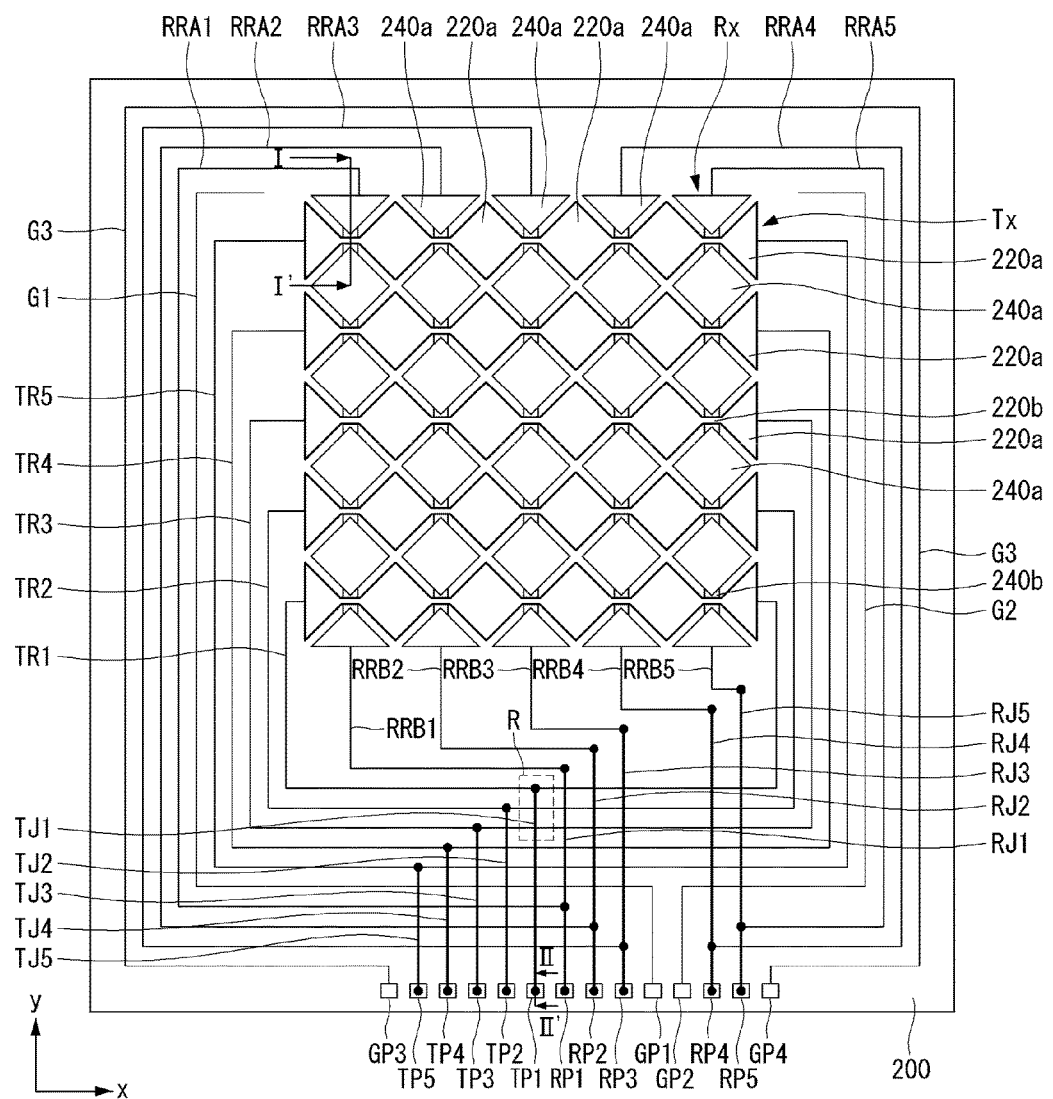
FIG. 3 is a plan view illustrating a touch sensor according to a first embodiment of this disclosure.
Figure 5:
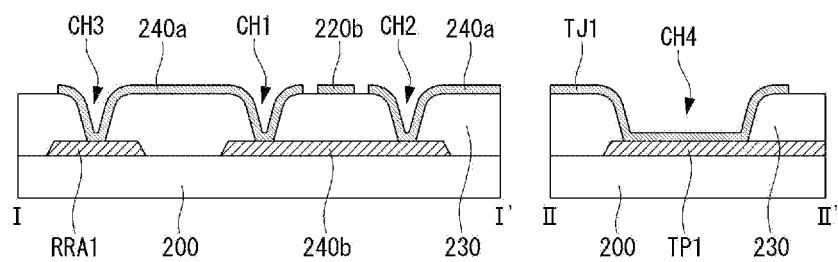
FIG. 5 is a cross-sectional view taken along lines I-I' and II-IF of FIG. 3.
Figure 6:
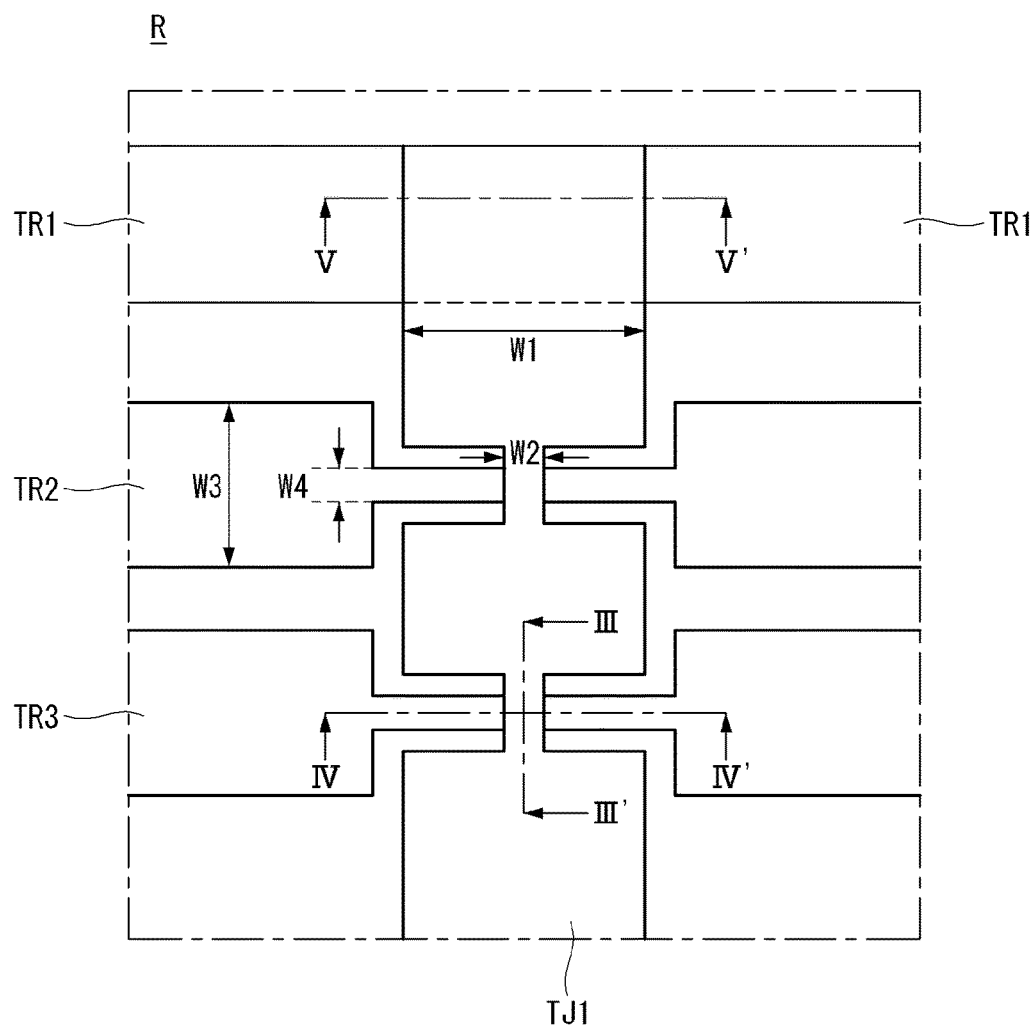
FIG. 6 is a plan view enlargely illustrating "R" region of FIG. 3.
Figure 7:
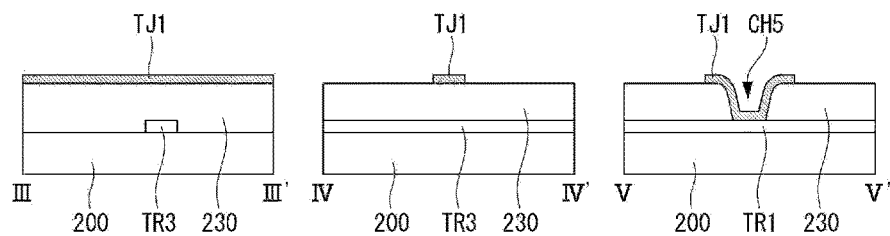
FIG. 7 is a cross-sectional view taken along lines III-III', IV-IV' and V-V' of FIG. 6.

First of all, a first embodiment of this disclosure will be described in detail with reference to FIGS. 3 to 7. FIG. 3 is a plan view illustrating a touch sensor according to a first embodiment of this disclosure, FIG. 4 is a right side cross-sectional view partially illustrating the touch sensor integrated type OLED display device in which the touch sensor shown in FIG. 3 is applied to an OLED display device, FIG. 5 is a cross-sectional view taken along lines I-I' and II-IF of FIG. 3, FIG. 6 is a plan view enlargely illustrating "R" region of FIG. 3, and FIG. 7 is a cross-sectional view taken along lines III-III', IV-IV' and V-V' of FIG. 6.

Figure 4:
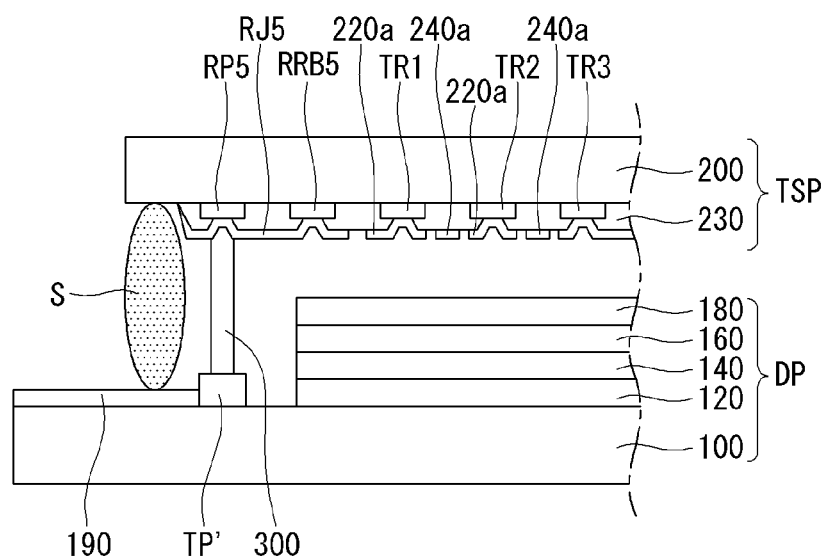
FIG. 4 is a right side cross-sectional view partially illustrating the touch sensor integrated type OLED display device in which the touch sensor shown in FIG. 3 is applied to an OLED display device.

Referring to FIGS. 3 and 4, the touch sensor integrated type OLED display device to which the touch sensor according to the first embodiment of this disclosure is applied includes an OLED display panel DP, a touch sensor TS arranged to face the OLED display panel DP, and a sealant S for adhering the touch sensor TS to the OLED display panel DP.

The touch sensor TS includes an upper substrate 200, a plurality of first touch electrode serials Tx formed on the upper substrate 200 and arranged in parallel with a first direction (e.g. x direction), and a plurality of second touch electrode serials Rx arranged in a second direction (e.g. y direction) which crosses over the first direction. The plurality of second touch electrode serials Rx are electrically insulated from the plurality of first touch electrode serials Tx. The plurality of first and second touch electrode serials Tx and Rx function as components of the touch sensor.

The touch sensor TS includes a plurality of first routing wires TR1 to TR5, a plurality of 2-1 routing wires RRA1 to RRA5, and a plurality of 2-2 routing wires RRB1 to RRB5.

The routing wires TR1 to TR5, RRA1 to RRA5 and RRB1 to RRB5 are formed at outside of a region in which the plurality of first and second touch electrode serials Tx and Rx are formed. Each of the plurality of first routing wires TR1 to TR5 has one end connected with one end of a corresponding first touch electrode serial Tx and another end connected with another end of the corresponding first touch electrode serial Tx. Each of the plurality of 2-1 routing wires RRA1 to RRA5 has one end connected with one end of a corresponding second touch electrode serial Rx and another end connected with one of first pads TP1 to TP5. Each of the plurality of 2-2 routing wires RRB1 to RRB5 has one end connected with another end of the corresponding second touch electrode serial Rx and another end connected with one of second pads RP1 to RP5.

Also, the touch sensor includes a first and second ground wires G1 and G2 to prohibit electrical interference between the first routing wires TR1 to TR5 and the 2-1 and 2-2 routing wires RRA1 to RRA5 and RRB1 to RRB5. The first ground wire G1 is formed between the outmost first routing wire TR5 and the innermost 2-1 routing wire RRA1, and the second ground wire G2 is formed between the outmost first routing wire TR5 and the innermost 2-1 routing wire RRA5. The touch sensor also includes a third ground wire G3 which surrounds the first and second touch electrode serials Tx and Rx and the routing wires TR1~TR5, RRA1~RRA5, RRB1~RRB5 in order to protect them from static electricity flown from the outside of the touch sensor TS.

The touch sensor TS includes a plurality of first pads TP1 to TP5, a plurality of second pads RP1 to RP5 and a plurality of ground pads GP1 to GP4 which are formed at outside of a region in which the routing wires TR1 to TR5, RRA1 to RRA5 and RRB1 to RRB5 and the ground wires G1 to G3 are formed. The touch sensor also includes a plurality of first jumping wires TJ1 to TJ5 and a plurality of second jumping wires RJ1 to RJ5.

The first pads TP1 to TP5 are respectively connected with the first routing wires TR1 to TR5 via the first jumping wires TJ1 to TJ5. Each of the second pads RP1 to RP3 are correspondingly connected with another of the two ends of each of the 2-1 routing wires RRA1 to RRA3 and another of the two ends of each of the 2-2 routing wires RRB1 to RRB3 via the second jumping wires RJ1 to RJ3. Also, each of the second pads RP4 to RP5 are correspondingly connected with another of the two ends of each of the 2-1 routing wires RRA4 to RRA5 and another of the two ends of each of the 2-2 routing wires RRB4 to RRB5 via the second jumping wires RJ4 to RJ5. The first ground pad GP1 is connected with one end of the first ground wire G1, the second ground pad GP2 is connected with one end of the second ground wire G2, the third ground pad GP3 is connected with one end of the third ground wire G3, and the fourth ground pad GP4 is connected with another end of the third ground wire G3.

Referring to FIGS. 3 to 5, each of the first touch electrode serials Tx includes a plurality of first electrode patterns 220a and a plurality of first connection patterns 220b which connects neighboring first electrode patterns 220a with each other. Each of the plurality of second touch electrode serial Rx has a plurality of second electrode patterns 240a, and a plurality of second connection patterns 240b which connect neighboring second electrode patterns 240a with each other.

The first touch electrode serial Tx is similar to the second touch electrode serial Rx. But there is a difference in that the first electrode patterns 220a and the first connection patterns 220b of the first touch electrode serial Tx are integrally formed, and the second electrode patterns 240a and the second connection patterns 240b of the second touch electrode serial Rx are independently formed and connected with each other by the connection patterns 220b.

Hereinafter, the difference will be described in greater detail. The plurality of second connection patterns 240b are formed in a predetermined distance along the first and second directions (e.g. x and y directions) on the upper substrate 200. An insulation layer 230 is formed on the upper substrate 200 to cover the second connection patterns 240b. The insulation layer 230 has first and second contact holes CH1 and CH2 which expose portions of the second connection pattern 240b. Although, the two contact holes CH1 and CH2 expose the second connection pattern 240b as shown in FIG. 5 but the number of the contact holes not limited thereto. For example, the number of the contact holes may be set to three or more than three. The neighboring second electrode patterns 240a are connected with each other by the second connection pattern 240b because the neighboring second electrode patterns 240a are filled in the first and second contact holes CH1 and CH2 respectively.

As mentioned above, it is described that the insulation layer 230 covers the second connection patterns 240b and has the first and second contact holes CH1 and CH2 to expose at least two portions of the second connection pattern 240b. However this disclosure is not limited thereto. For example, a plurality of insulation patterns may be formed at only intersections of the first and second connection patterns, and the first and second electrode patterns 220a and 240a may be formed on the upper substrate 200.

On the other hand, the first routing wires TR1 to TR5, the 2-1 and 2-2 routing wires RRA1 to RRA5 and RRB1 to RRB5, the first to third ground wires G1 to G3, the first and second pads TP1 to TP5 and RP1 to RP5, and the ground pads GP1 to GP4 are formed at a region out of the region in which the first and second touch electrode serials Tx and Rx are formed. The insulating layer 230 is formed on the upper substrate 200 to cover the routing wires TR1 to TR5, RRA1 to RRA5 and RRB1 to RRB5, the grounds wires G1 to G3, and the pads TP1 to TP5, RP1 to RP5 and GP1 to GP4. As shown in FIG. 5, the insulation layer 230 includes third contact holes CH3 for exposing both ends of each of the first routing wires TR1 to TR5, one of the two ends of each of the 2-1 routing wires RRA1 to RRA5 and one of the two ends of each of the 2-2 routing wires RRB1 to RRB2, and fourth contact holes CH4 for exposing the first pads TP1 to TP5, respectively. The both ends of each of the first routing wires TR1 to TR5 are connected with the outmost first electrode patterns 220a via the third contact holes CH3, respectively, and one of the two ends of each of the 2-1 and 2-2 routing wires RRA1 to RRA5 and RRB1 to RRB5 are connected with the outmost second electrode patterns 240a via the third contact holes CH3, respectively. Also, the first jumping wires TJ1 to TJ5 are connected with the first pads TP1 to TP5 via the fourth contact holes CH4, respectively. Accordingly, the first jumping wires TJ1 to TJ5 connect the first routing wires TR1 to TR5 with the first pads TP1 to TP5, respectively. In the first embodiment of this disclosure, the first jumping wires TJ1 to TJ5 connect with the first pads TP1 to TP5 in one-to-one correspondence, and the second jumping wires RJ1 to RJ5 connect with the second pads RP1 to RP5 in one-to-one correspondence Hereinafter, the connection relation between the first routing wires TR1 to TR5 and the first jumping wires TJ1 to TJ5 and structures of the first routing wires TR1 to TR5 and the first jumping wires TJ1 to TJ5 will be described in detail with reference to FIGS. 6 and 7.

Referring to FIGS. 6 and 7, the jumping wire TJ1 is connected with the first routing wire TR1 exposed via a fifth contact hole CH5 which passes through the insulation layer 230. In more detailed, the first jumping wire TJ1 has one end connected with the first routing wire TR1 via the fifth contact hole CH 5 as shown in FIG. 7 and another end connected with the first pad TP1 via the fourth contact hole CH4 as shown in FIG. 5.

As mentioned above, in the touch sensor according to the first embodiment of this disclosure, it is possible to considerably reduce total resistance value of the touch electrode serials because each of the first and second routing wires has a double routing wire structure in which each of the first and second routing wires are connected with both ends of each first and second touch electrode serials, respectively. Accordingly, it is possible to enhance a touch sensibility of the touch sensor because the time constant of the touch sensor is reduced according to the reduction of the resistance value.

On the other hand, it is possible to achieve the enhancement effect of touch sensibility because of the resistance reduction if the double routing wire structure is adopted to the touch sensor, but the number of touch pads connected with the routing wires for transmitting and receiving driving signals and sensing signals increases to twice than that of the single routing wire structure. In the touch sensor integrated type OLED display device, a data driver and a gate driver for driving the OLED display panel DP, and driving pads for supplying various signals and power to the data and gate drivers should be formed on a lower substrate 100 of the OLED display panel DP. Accordingly, it is impossible to obtain a sufficient space in which touch pads to be connected with the first and second pads of the touch sensor should be formed. Although the touch sensor according to the first embodiment of this disclosure adopts the double routing wire structure, it is unnecessary to form additional pads to the touch sensor TS because the double routing wires are connected with the first and second pads using the first and second jumping wires. That is, the number of the first and second pads is same to that of the single routing wire structure. Accordingly, it is unnecessary to prepare an additional space on the display panel DP for forming the additional pads connected with the first and second pads of the touch sensor TS.

Referring to FIGS. 6 and 7, the first jumping wire TJ1 crosses over the first routing wires TR2 and TR3 with the insulation therebetween. A first width W1 of the first jumping wire TJ1 is larger than a second width W2 thereof. The first width W1 is a width at a region where the first jumping wire TJ1 does not cross over the first routing wires TR2 and TR3. The second width W2 is a width at a region where the first jumping wire TJ1 crosses over the first routing wires TR2 and TR3. Similarly, a third width W3 of the first routing TR2 is larger than a fourth width W4 thereof. The third width W3 is a width at a region where the first routing wire TR2 does not cross over the first jumping wire TJ1. The fourth width W4 is a width at a region where the first routing wire TR2 crosses over the first jumping TJ1. In this disclosure, it is described about only cross structure of the first jumping wire TJ1 and the first routing wires TR2 and TR3 in order to simplify the description. Accordingly, it should be understood that all of the cross structure of the first and second jumping wires and the first and second routing wires are similarly formed.

Figure 8:
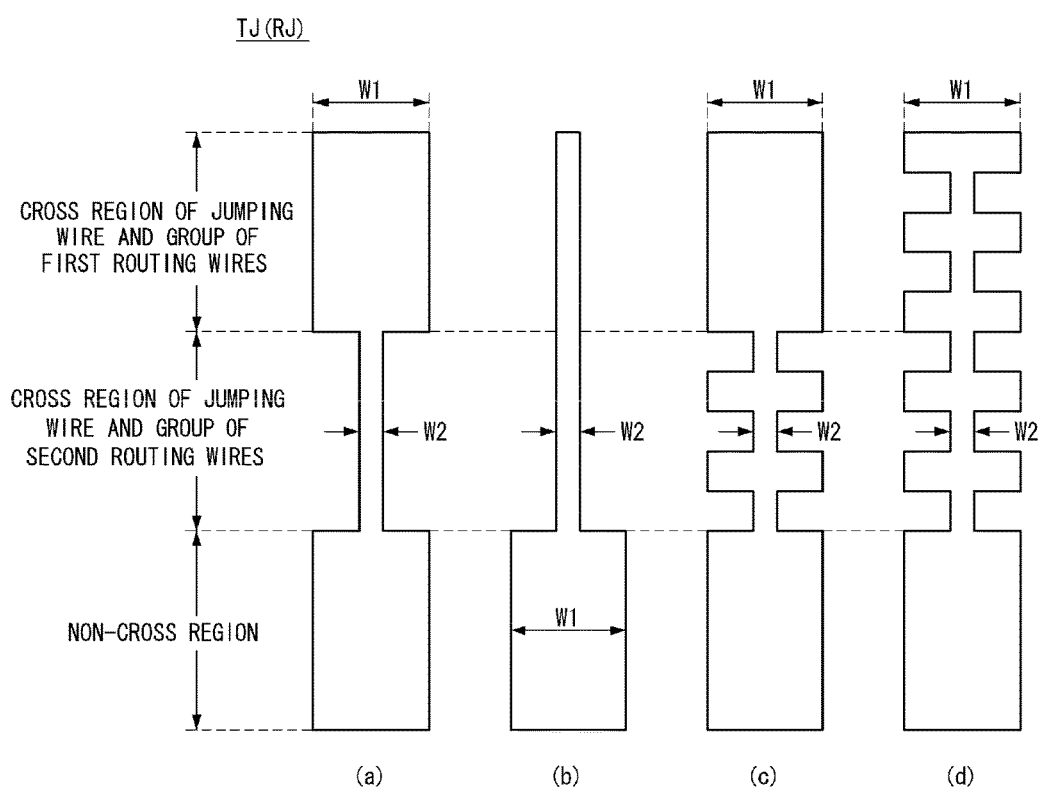
FIGS. 8 (a), (b), (c) and (d) are plan views illustrating various shapes of the jumping wires shown in FIG. 3.

FIGS. 8 (a), (b), (c) and (d) are plan views illustrating various shapes of the first and second jumping wires shown in FIG. 3. FIG. 8(a) illustrates an example in which each of the first and second jumping wires TJ1 to TJ5 and RJ1 to RJ5 has a first width W1 and a second width W2 smaller than the first width W1. The first width W1 is a width at regions where each of the first and second jumping wires TJ1 to TJ5 and RJ1 to RJ5 does not cross over a group of the first or second routing wires TR1~TR5, RRA1~RRA5 and RRB1~RRB5, or at regions where each of the first and second jumping wires TJ1 to TJ5 and RJ1 to RJ5 crosses over a group of the first routing wires TR1 to TR5. The second width W2 is a width at regions where each of the first or second jumping wires TJ1 to TJ5 and RJ1 to RJ5 crosses over a group of the second routing wires RRA1~RRA5 or RRB1~RRB5.

FIG. 8(b) illustrates another example in which each of the first and second jumping wires TJ1 to TJ5 and RJ1 to RJ5 has the first width W1 and the second width W2 smaller than the first width W1. The first width W1 is a width at regions where each of the first and second jumping wires TJ1 to TJ5 and RJ1 to RJ5 does not cross over the group of the first or second routing wires TR1~TR5, RRA1~RRA5 and RRB1~RRB5. The second width W2 is a width at regions where each of the first and second jumping wires TJ1 to TJ5 and RJ1 to RJ5 crosses over the group of the first or second routing wires TR1~TR5, RRA1~RRA5 and RRB1~RRB5.

FIG. 8(c) illustrates another example in which each of the first and second jumping wires TJ1 to TJ5 and RJ1 to RJ5 has a first width W1 and a second width W2 smaller than the first width W1. The first width W1 is a width at regions where each of the first and second jumping wires TJ1 to TJ5 and RJ1 to RJ5 does not cross the group of the first and second routing wires TR1~TR5, RRA1~RRA5 and RRB1~RRB5, or at regions where each of the first and second jumping wires TJ1 to TJ5 and RJ1 to RJ5 crosses over the group of the first routing wires TR1 to TR5. Also, the first width W1 is the width at regions where each of the first or second jumping wires TJ1 to TJ5 and RJ1 to RJ5 does not cross over each of the second routing wires RRA1~RRA5 and RRB1~RRB5 in a region where the group of the second routing wires RRA1~RRA5 and RRB1~RRB5 are arranged. The second width W2 is a width at regions where each of the first or second jumping wires TJ1 to TJ5 and RJ1 to RJ5 crosses over each of the second routing wires RRA1~RRA5 and RRB1~RRB5 in the region where the group of the second routing wires RRA1~RRA5 and RRB1~RRB5 are arranged.

FIG. 8(d) illustrates another example in which each of the first and second jumping wires TJ1 to TJ5 and RJ1 to RJ5 has a first width W1 and a second width W2 smaller than the first width W1. The first width W1 is the width at regions where each of the first or second jumping wires TJ1 to TJ5 and RJ1 to RJ5 does not cross over each of the first routing wires TRA1~TRA5 in a region where the group of the first routing wires TRA1~TRA5 are arranged. Also, the first width W1 is the width at regions where each of the first or second jumping wires TJ1 to TJ5 and RJ1 to RJ5 does not cross over each of the second routing wires RRA1~RRA5 and RRB1~RRB5 in a region where the group of the second routing wires RRA1~RRA5 and RRB1~RRB5 are arranged. The second width W2 is the width at regions where each of the first or second jumping wires TJ1 to TJ5 and RJ1 to RJ5 crosses over each of the first routing wires TRA1~TRA5 in a region where the group of the first routing wires TRA1~TRA5 are arranged. Also, the second width W2 is a width at regions where each of the first or second jumping wires TJ1 to TJ5 and RJ1 to RJ5 crosses over each of the second routing wires RRA1~RRA5 and RRB1~RRB5 in a region where the group of the second routing wires RRA1~RRA5 and RRB1~RRB5 are arranged.

Thus, it is possible to reduce parasitic capacitance generated by the cross of the first and second jumping wires and the first and second routing wires if the second width W2 at regions where each of the first and the second jumping wires TJ1 to TJ5 and RJ1 to RJ5 crosses over each of the first and second routing wires TR1 to TR5, RRA1 to RRA5 and RRB1 to RRB5 is smaller than the first width W1. Accordingly, it is possible to enhance touch sensibility of the touch sensor integrated type display device because of the reduction of the time constant by the reduction of the parasitic capacitance.

Figure 9:
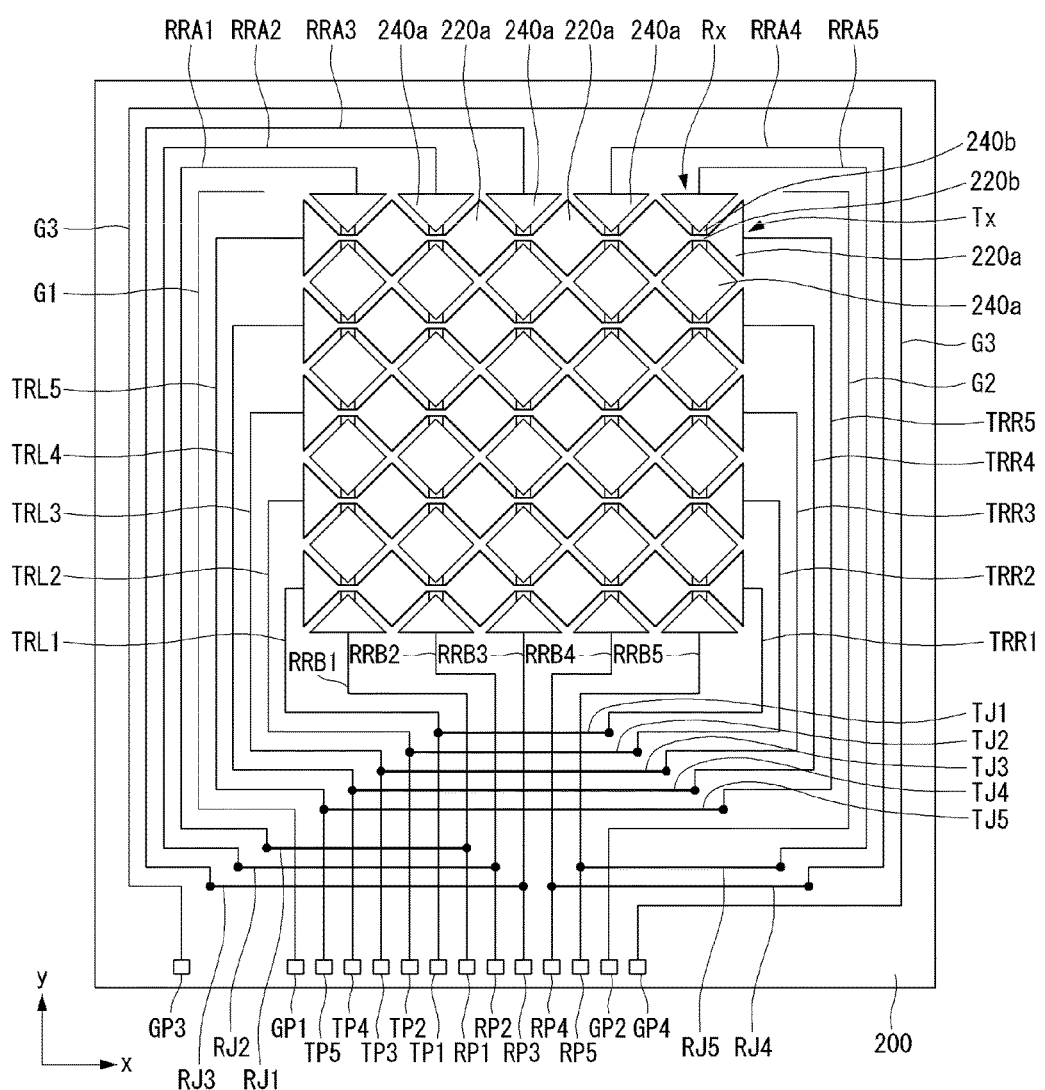
FIG. 9 is a plan view illustrating a touch sensor according to a second embodiment of this disclosure.
Figure 10:
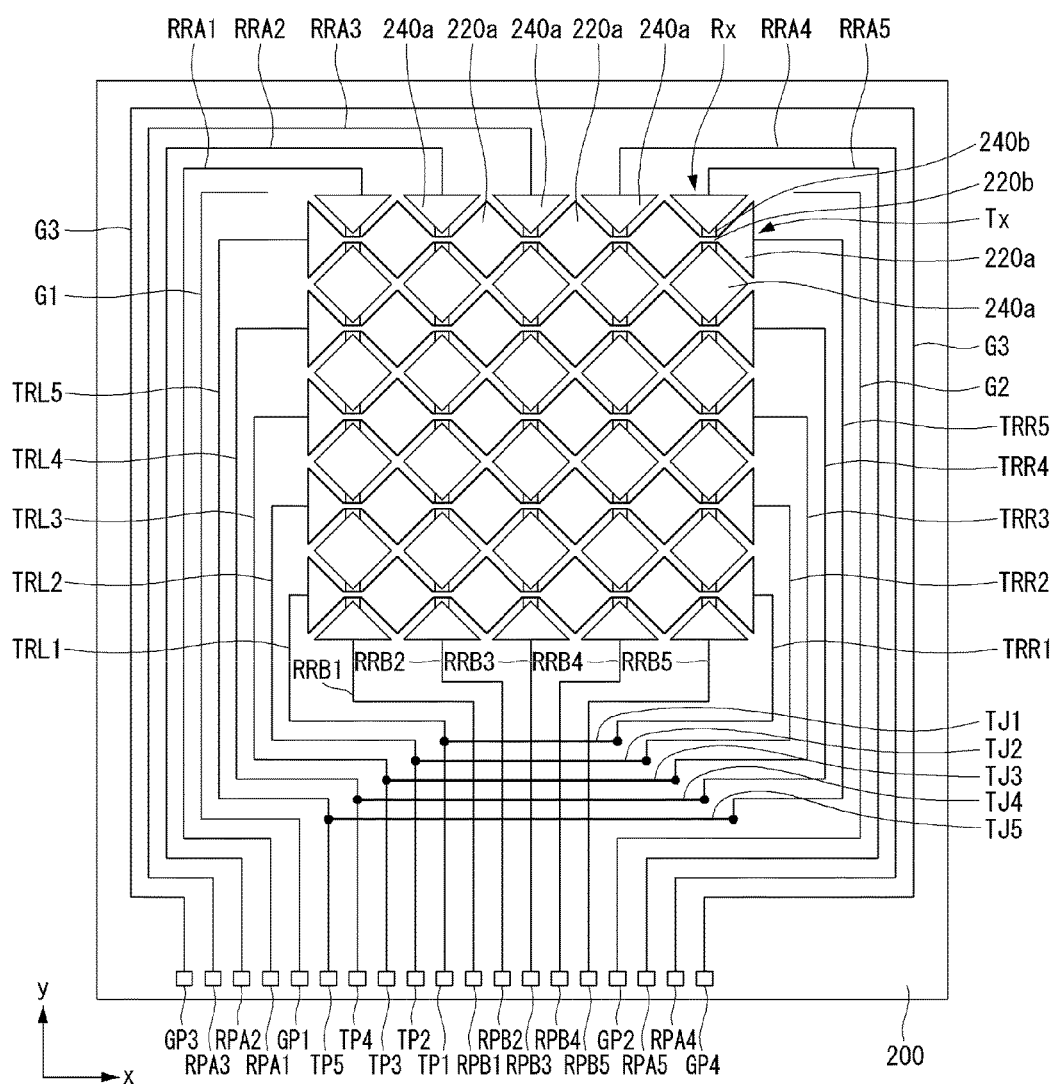
FIG. 10 is a plan view illustrating a touch sensor according to a third embodiment of this disclosure.
Figure 11:
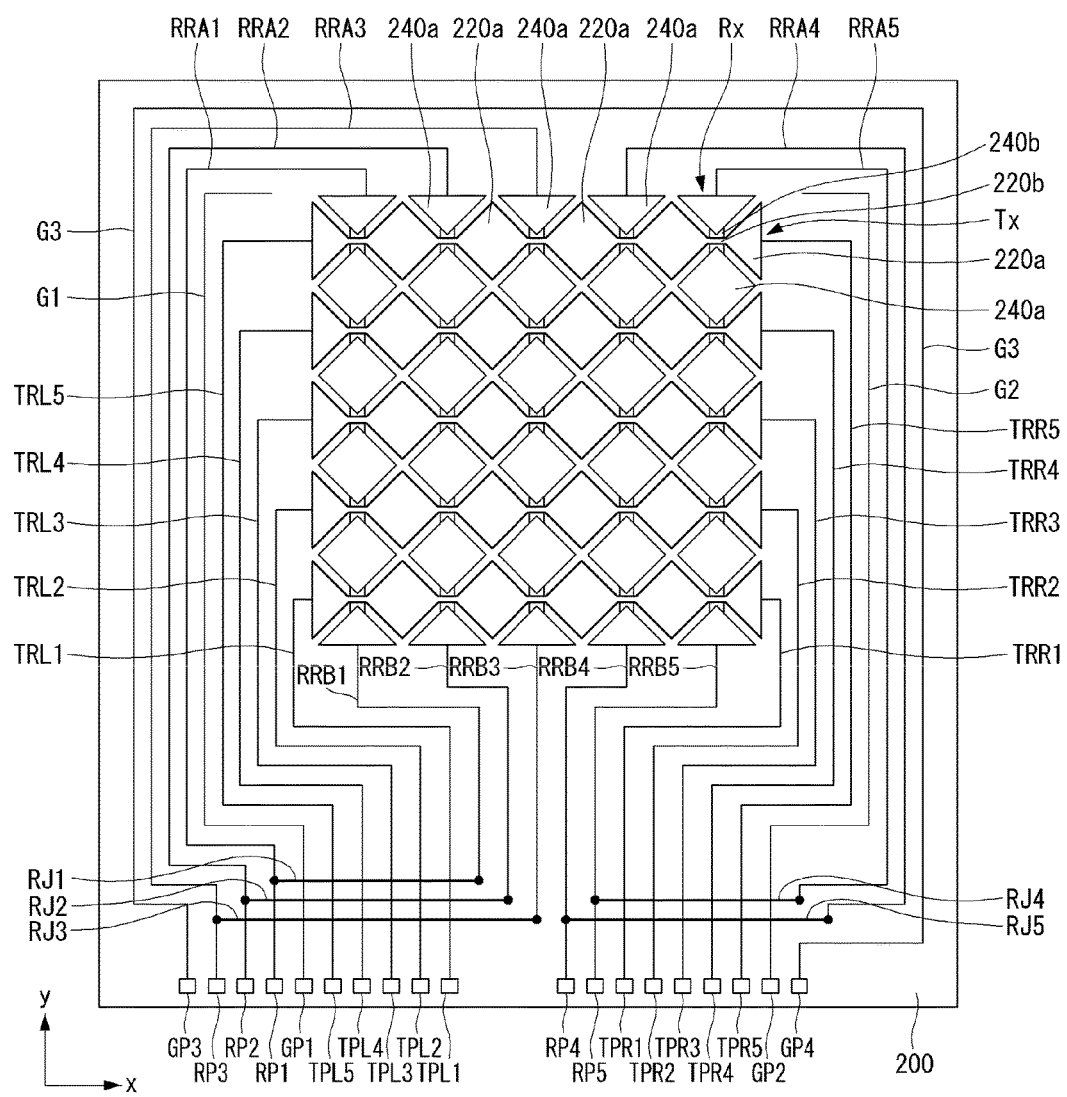
FIG. 11 is a plan view illustrating a touch sensor according to a fourth embodiment of this disclosure.

Hereinafter, touch sensors according to a second to fourth embodiments of this disclosure will be described in detail with reference to FIGS. 9 to 11. FIG. 9 is a plan view illustrating a touch sensor according to a second embodiment of this disclosure, FIG. 10 is a plan view illustrating a touch sensor according to a third embodiment of this disclosure, and FIG. 11 is a plan view illustrating a touch sensor according to a fourth embodiment of this disclosure.

The touch sensors according the second to fourth embodiments of this disclosure are similar to the touch sensor according to the first embodiment of this disclosure excepting that the connection relationship among first routing wires, second routing wires, first jumping wires and the second jumping wires. Accordingly, it is omitted description about components overlapped with the first embodiment.

In the touch sensor according to the first embodiment of this disclosure, each of the first routing wires TR1 to TR5 forms a closed-loop with a corresponding touch electrode serial because both ends of each of the first routing wires are connected both ends of the each of the touch electrode serials Tx as shown in FIG. 3. The first routing wires TR1 to TR5 are respectively connected with the first pads TP1 to TP5 via the jumping wires TJ1 to TJ5. On the other hand, each of the 2-1 routing wires RRA1 to RRA5 has one end connected with one end of each of the second touch electrode serials Rx and another end connected with each of the second pads RP1 to RP5. Also, each of the 2-2 routing wires RRB1 to RRB5 has one end connected with another end of each of the second touch electrode serials Rx and another end connected with each of the 2-1 routing wires RRA1 to RRA5 via the second jumping wires RJ1 to RJ5. Also, each of the 2-1 routing wires RRA1 to RRA5 and corresponding one of the 2-2 routing wires RRB1 to RRB5 forms a closed-loop with a corresponding touch electrode serial via the second jumping wires RJ1 to RJ5 respectively. That is, without the second jumping wires RJ1 to RJ5, each of the 2-1 routing wires RRA1 to RRA5 and corresponding one of the 2-2 routing wires RRB1 to RRB5 can only forms an open-loop with a corresponding touch electrode serial. The definitions of the "closed-loop" and the "open-loop" discussed above can be used in the following embodiments.

In the touch sensor according to the second embodiment of this disclosure, each of the 1-1 routing wires TRL1 to TRL5 has one end correspondingly connected with one of the two ends of each of the first touch electrode serials Tx and another end correspondingly connected with each of the first pads TP1 to TP5 as shown in FIG. 9. Also, each of the 1-2 routing wires TRR1 to TRR5 has one end correspondingly connected with another of the two ends of each of the first touch electrode serials Tx and another end correspondingly connected with each of the 1-1 routing wires TRL1 to TRL5 via the first jumping wires TJ1 to TJ5. Each of the 2-1 routing wires RRA1 to RRA5 has one end correspondingly connected with one of the two ends of each of the second touch electrode serials Rx and another end correspondingly connected with each of the 2-2 routing wires RRB1 to RRB5 via the second jumping wires RJ1 to RJ5. Each of the 2-2 routing wires RRB1 to RRB5 has one end correspondingly connected with another of the two ends of each of the second touch electrode serials Rx and another end correspondingly connected with each of the second pads RP1 to RP5. The first jumping wires TJ1 to TJ5 connect the 1-1 routing wires TRL1 to TRL5 to the 1-2 routing wires TRR1 to TRR5 respectively, and the second jumping wires RJ1 to RJ5 connect the 2-1 routing wires RRA1 to RRA5 to the 2-2 routing wires RRB1 to RRB5 respectively. In the touch sensor according to the second embodiment of this disclosure, each of the second jumping wires RJ1 to RJ5 has a first width and a second width smaller than the first width, the first width being a width at regions where each of the second jumping wires RJ1 to RJ5 does not cross over the 1-1 routing wires TRL1 to TRL5, and the second width being a width at regions where each of the second jumping wires RJ1 to RJ5 crosses over the 1-1 routing wires TRL1 to TRL5.

In the touch sensor according to the third embodiment of this disclosure, each of the 1-1 routing wires TRL1 to TRL5 has one end correspondingly connected with one of the two ends of each of the first touch electrode serials Tx and another end correspondingly connected with each of the first pads TP1 to TP5 as shown in FIG. 10. Also, each of the 1-2 routing wires TRR1 to TRR5 has one end correspondingly connected with another of the two ends of each of the first touch electrode serials Tx and another end correspondingly connected with each of the 1-1 routing wires TRL1 to TRL5 via the first jumping wires TJ1 to TJ5. Each of the 2-1 routing wires RRA1 to RRA5 has one end correspondingly connected with one of the two ends of each of the second touch electrode serials Rx and another end correspondingly connected with each of the 2-1 pads RPA1 to RPA5. Each of the 2-2 routing wires RRB1 to RRB5 has one end correspondingly connected with another of the two ends of each of the second touch electrode serials Rx and another end correspondingly connected with each of the 2-2 pads RPB1 to RPB5. Each of the first jumping wires TJ1 to TJ5 has one end correspondingly connected with one end of each of the 1-1 routing wires TRL1 to TRL5 and another end correspondingly connected with each of the 1-2 routing wires TRR1 to TRR5. Accordingly, the first jumping wires TJ1 to TJ5 connect the 1-1 routing wires TRL1 to TRL5 to the 1-2 routing wires TRR1 to TRR5 respectively. In the touch sensor according to the third embodiment of this disclosure, each of the first jumping wires TJ1 to TJ5 has a first width and a second width smaller than the first width, the first width being a width at regions where each of the first jumping wires TJ1 to TJ5 does not cross over the 2-2 routing wires RPB1 to RPB5, and the second width being a width at regions where each of the first jumping wires TJ1 to TJ5 crosses over the 2-2 routing wires RPB1 to RPB5.

In the touch sensor according to the fourth embodiment of this disclosure, each of the 1-1 routing wires TRL1 to TRL5 has one end correspondingly connected with one of the two ends of each of the first touch electrode serials Tx and another end correspondingly connected with each of the 1-1 pads TPL1 to TPL5 as shown in FIG. 11. Also, each of the 1-2 routing wires TRR1 to TRR5 has one end correspondingly connected with another of the two ends of each of the first touch electrode serials Tx and another end correspondingly connected with each of the 1-2 pads TPR1 to TPR5. Each of the 2-1 routing wires RRA1 to RRA3 has one end correspondingly connected with one of the two ends of each of a part of the second touch electrode serials Rx and another end correspondingly connected with each of the second pads RP1 to RP3. Each of the 2-1 routing wires RRA4 to RRA5 has one end correspondingly connected with one of the two ends of each of remaining part of the second touch electrode serials Rx and another end correspondingly connected with each of the 2-2 routing wires RRB4 to RRB5 via the second jumping wires RJ5 and RJ4. Each of the 2-2 routing wires RRB1 to RRB3 has one end correspondingly connected with another of the two ends of each of a part of the second touch electrode serials Rx and another end correspondingly connected with each of the 2-1 routing wires RRA1 to RRA3 via the second jumping wires RJ1 to RJ3. Each of the 2-2 routing wires RRB4 to RRB5 has one end correspondingly connected with another of the two ends of each of a remaining part of the second touch electrode serials Rx and another end correspondingly connected with each of the second pads RP4 to RP5. The second jumping wires RJ1 to RJ5 connect the 2-1 routing wires RRA1 with the 2-2 routing wires RRB1 to RRB5. In the touch sensor according to the fourth embodiment of this disclosure, each of the second jumping wires RJ1 to RJ5 has a first width and a second width smaller than the first width, the first width being a width at regions where each of the second jumping wires RJ1 to RJ5 does not cross over the 1-1 routing wires TRL1 to TRL5 or the 1-2 routing wires TRR1 to TRR5, and the second width being a width at regions where each of the second jumping wires RJ1 to RJ5 crosses over the 1-1 routing wires TRL1 to TRL5 or the 1-2 routing wires TRR1 to TRR5.

It can be understood by one skilled in the art that the number of the first touch electrode serials, the second touch electrode serials, first routing wires (including 1-1 routing wires and 1-2 routing wires), the second routing wires (including 2-1 routing wires and 2-2 routing wires), the first jumping wires, the second jumping wires, the ground wires, the first pads, the second pads and the ground pads can be any integer, and are not limited to the first to fourth embodiments of this disclosure. Especially, the number of the first jumping wires and the second jumping wires depends on the connection relationship among the first routing wires, the second routing wires, the first jumping wires, the second jumping wires, the first pads, and the second pads.

As used in the present application, the singular forms "a" "an" and "the" generally mean "at least one", "one or more", and other plural references unless the context clearly dictates otherwise.

As mentioned above, in the touch sensors according to the first to fourth embodiments of this disclosure, it is possible to considerably reduce resistance value of the routing wires because each of the first and second routing wires has a double routing wire structure in which routing wires are connected with both ends of first and second touch electrode serials, respectively. Accordingly, it is possible to enhance a touch sensibility of the touch sensor because the time constant of the touch sensor is reduced according to the reduction of the resistance value.

Furthermore, it is unnecessary to increase the number of pad for supplying touch signals or power if the double routing wires are connected with each other via the jumping wires according to the first embodiment of this disclosure. Accordingly, it is possible to reduce space for forming additional pads on the display panel.

Table 1 shows resistance values of the touch sensor in the related art touch sensor having a single routing structure and the touch sensor having a double routing structure according to this disclosure.

TABLE 1

|  | routing wires (Ω) | jumping wires (Ω) | touch electrode serial (Ω) | sum (Ω) | relative ratio |
|---|---|---|---|---|---|
| A relate art (single routing) | 250 | — | 2000 | 2250 | 100% |
| This disclosure (double routing) | 400 | 876 | 2000/4 | 1776 | 78.9% |

If resistance value of the routing wire is 250Ω and resistance value of the touch electrode serial is 2000Ω in the related art touch sensor having a single routing structure, the total resistance value is 2250Ω. In the touch sensor according to this disclosure, the number of total wires increases because the jumping wires and double routing wires are added. However, total resistance value decreases because the routing wires are connected with both ends of the touch electrode serial, and signals and power for touch driving and sensing are supplied to both ends of the touch electrode serial via the double routing wires, thereby forming a parallel circuit. For example, if the touch electrode serial has four electrode patterns and resistance value of each electrode pattern is R, the total resistance value of the related art single routing wire structure is 4R, but the total resistance value of the double routing wire structure is R by equation $1/(1/(R+R)+1/(R+R))$. As a result, the resistance value of one touch electrode serial according to this disclosure is reduced to a quarter relative to the single routing wire structure. Thus, the total resistance value of the double routing wire structure according to this disclosure is reduced to 78.9% relative to that of the single routing wire structure.

Although above embodiments of this disclosure describes that the touch sensors are applied to OLED display devices, this disclosure is not limited thereto. For example, touch sensors according to this disclosure may be applied to display devices such as liquid crystal display (LCD) devices, field emission display (FED) devices, plasma display panels (PDPs), organic light emitting diode display (OLED) devices, and electrophoresis display devices, etc.

Although the embodiments of this disclosure have been described with reference to a number of illustrative examples, it should be understood that numerous other modifications and changes can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A touch sensor for a display device, comprising:
   a substrate including a first region and a second region outside of the first region;
   a plurality of first touch electrode serials arranged on the first region of the substrate in a first direction;
   a plurality of second touch electrode serials electrically insulated from the plurality of first touch electrode serials and arranged on the first region of the substrate in a second direction that crosses the first direction;
   a plurality of first routing wires arranged on the second region, each of which is respectively directly physically connected with both ends of each of the plurality of first touch electrode serials to form a closed-loop;
   a plurality of second routing wires arranged on the second region, each of which has a 2-1 routing wire connected with one end of each of the plurality of second touch electrode serials and a 2-2 routing wire connected with another end of each of the plurality of second touch electrode serials to form an open-loop;
   a first ground wire disposed between the first routing wire and the 2-1 routing wire adjacent to each other at one side on the second region of the substrate to surround the first routing wire adjacent to the second routing wire, and connected to a first ground pad;
   a second ground wire disposed between the first routing wire and the 2-1 routing wire adjacent to each other at the other side on the second region of the substrate to surround the first routing wire adjacent to the 2-1 routing wire, and connected to a second ground pad;
   a third ground wire surrounding the first and second touch electrode serials and the first and second routing wires along an edge of the substrate, and having one end connected to a third ground pad and another end connected to a fourth ground pad;
   a plurality of first jumping wires on the second region of the substrate respectively connecting the closed loops formed by the first routing wires with a plurality of first pads, wherein the plurality of first jumping wires is connected with the first routing wires respectively via a contact hole which passes through an insulation layer; and
   a plurality of second jumping wires on the second region of the substrate respectively connecting the 2-1 routing wires and the 2-2 routing wires forming the open-loops with a plurality of second pads, wherein the plurality of second jumping wires is connected with the 2-1 routing wires and the 2-2 routing wires respectively via a contact hole which passes through an insulation layer;
   wherein the first and second ground pads are disposed immediately adjacent to each other, and
   wherein the plurality of second jumping wires has an overlap with the first ground wire and the second ground wire.

2. The touch sensor of claim 1, wherein:
   the 2-1 routing wires each including one end connected with one end of the second touch electrode serial and another end connected with the second jumping wire, the 2-2 routing wires each including one end connected with another end of the second touch electrode serial and another end connected with the second pad via the second jumping wire.

3. The touch sensor of claim 1, wherein each of the first and second jumping wires includes a first width and a second width smaller than the first width, the first width being a width at a region where the first or second jumping wire does not cross over the first routing wires and the 2-1 routing wires, the second width being a width at a region where the first or second jumping wire crosses over the first routing wires and the 2-1 routing wires.

4. The touch sensor of claim 1, wherein each of the first touch electrode serials includes a plurality of first electrode patterns and a plurality of first connection patterns which connect neighboring first electrode patterns to each other, and each of the plurality of second touch electrode serial includes a plurality of second electrode patterns and a plurality of second connection patterns which connect neighboring second electrode patterns to each other.

5. The touch sensor of claim 4, wherein the first electrode patterns and the first connection patterns of the first touch electrode serial are integrally formed, and the second electrode patterns and the second connection patterns of the second touch electrode serial are independently formed.

6. The touch sensor of claim 4, wherein the plurality of second connection patterns are disposed on the substrate, an insulation layer is disposed on the substrate to cover the second connection patterns, the insulation layer has first and second contact holes which expose portions of the second connection patterns, the plurality of second electrode patterns are disposed on the insulation layer, and neighboring second electrode patterns of the plurality of second electrode patterns are connected with each other by the second connection pattern via the first and second contact holes.

7. A touch sensor for a display device, comprising:
a substrate including a first region and a second region outside of the first region;
a plurality of first touch electrode serials arranged on the first region of the substrate in a first direction;
a plurality of second touch electrode serials electrically insulated from the plurality of first touch electrode serials and arranged on the first region of the substrate in a second direction that crosses the first direction;
a plurality of first routing wires arranged on the second region, each of which is respectively directly physically connected with both ends of each of the plurality of first touch electrode serials to form a closed-loop;
a plurality of second routing wires arranged on the second region, each of which has a 2-1 routing wire connected with one end of each of the plurality of second touch electrode serials and a 2-2 routing wire connected with another end of each of the plurality of second touch electrode serials to form an open-loop;
a plurality of first jumping wires on the second region of the substrate respectively connecting the closed loops formed by the first routing wires with a plurality of first pads, wherein the plurality of first jumping wires is connected with the first routing wires respectively via a contact hole which passes through an insulation layer; and
a plurality of second jumping wires on the second region of the substrate respectively connecting the 2-1 routing wires and the 2-2 routing wires forming the open-loops with a plurality of second pads, wherein the one end of the second touch electrode serials is further from the second jumping wires than the another, opposite end of the second touch electrode serials, wherein the plurality of second jumping wires is connected with the 2-1 routing wires and the 2-2 routing wires respectively via a contact hole which passes through an insulation layer;
a first ground wire disposed between the first routing wire and 2-1 routing wire adjacent to each other at one side on the second region of the substrate to surround the first routing wire adjacent to the second routing wire at the one side, and connected to a first ground pad;
a second ground wire disposed between the first routing wire and the 2-1 routing wire adjacent to each other at the other side on the second region of the substrate to surround the first routing wire adjacent to the 2-1 routing wire at the another side, and connected to a second ground pad; and
a third ground wire surrounding the first and second touch electrode serials and the first and second routing wires along an edge of the substrate, and having one end connected to a third ground pad and another end connected to a fourth ground pad,
wherein the first and second ground pads are disposed immediately adjacent to each other, and
wherein the plurality of second jumping wires has an overlap with the first ground wire and the second ground wire.

8. The touch sensor of claim 7, wherein:
the 2-1 routing wires each including one end connected with one end of the second touch electrode serial and another end connected with the second jumping wire, the 2-2 routing wires each including one end connected with another end of the second touch electrode serial and another end connected with the second pad via the second jumping wire.

9. The touch sensor of claim 7, wherein each of the first and second jumping wires includes a first width and a second width smaller than the first width, the first width being a width at a region where the first or second jumping wire does not cross over the first routing wires and the 2-1 routing wires, the second width being a width at a region where the first or second jumping wire crosses over the first routing wires and the 2-1 routing wires.

10. The touch sensor of claim 7, wherein each of the first touch electrode serials includes a plurality of first electrode patterns and a plurality of first connection patterns which connect neighboring first electrode patterns to each other, and each of the plurality of second touch electrode serial includes a plurality of second electrode patterns and a plurality of second connection patterns which connect neighboring second electrode patterns to each other.

11. The touch sensor of claim 10, wherein the first electrode patterns and the first connection patterns of the first touch electrode serial are integrally formed, and the second electrode patterns and the second connection patterns of the second touch electrode serial are independently formed.

12. The touch sensor of claim 10, wherein the plurality of second connection patterns are disposed on the substrate, an insulation layer is disposed on the substrate to cover the second connection patterns, the insulation layer has first and second contact holes which expose portions of the second connection pattern, the plurality of second electrode patterns are disposed on the insulation layer, and neighboring second electrode patterns of the plurality of second electrode patterns are connected with each other by the second connection pattern via the first and second contact holes.

13. The touch sensor of claim 7, wherein the first ground wire is disposed between the outermost first routing wire and the innermost 2-1 routing wire.

14. The touch sensor of claim 13, wherein the innermost 2-1 routing wire surrounds the outermost first routing wire.

15. A touch sensor for a display device, comprising:
a substrate including a first region and a second region outside of the first region;
a plurality of first touch electrode serials arranged on the first region of the substrate in a first direction;
a plurality of second touch electrode serials electrically insulated from the plurality of first touch electrode serials and arranged on the first region of the substrate in a second direction that crosses the first direction;
a plurality of first routing wires arranged on the second region, each of which is respectively directly physically connected with both ends of each of the plurality of first touch electrode serials;
a plurality of second routing wires arranged on the second region, each of which has a 2 1 routing wire connected with one end of each of the plurality of second touch electrode serials and a 2-2 routing wire connected with another end of each of the plurality of second touch electrode serials to form a double routing wire structure;
a first ground wire disposed between the first routing wire and the 2-1 routing wire adjacent to each other at one side on the second region of the substrate to surround the first routing wire adjacent to the second routing wire, and connected to a first ground pad;

a second ground wire disposed between the first routing wire and the 2-1 routing wire adjacent to each other at the other side on the second region of the substrate to surround the first routing wire adjacent to the 2-1 routing wire, and connected to a second ground pad;

a third ground wire surrounding the first and second touch electrode serials and the first and second routing wires along an edge of the substrate, and having one end connected to a third ground pad and another end connected to a fourth ground pad;

a plurality of first jumping wires on the second region of the substrate respectively connecting the first routing wires with a plurality of first pads; and a plurality of second jumping wires on the second region of the substrate respectively connecting the 2-1 routing wires and the 2-2 routing wires with a plurality of second pads, the plurality of second jumping wires has an overlap with the first ground wire and the second ground wire, wherein the plurality of first jumping wires and the plurality of second jumping wires are connected with the first routing wires and the 2-1 routing wires and the 2-2 routing wires respectively via a contact hole which passes through an insulation layer so that a total resistance value of the touch sensor is reduced without an additional space for forming additional pads relative to a single routing wire structure.

16. The touch sensor of claim 15, wherein the plurality of first jumping wires is directly physically connected with a plurality of first pads and the plurality of second jumping wires is directly physically connected with a plurality of second pads.

17. The touch sensor of claim 15, wherein the plurality of first jumping wires and the plurality of second jumping wires extend in the second direction respectively and do not cross over each other.

18. The touch sensor of claim 15, wherein:
the 2-1 routing wires each including one end connected with one end of the second touch electrode serial and another end connected with the second jumping wire, the 2-2 routing wires each including one end connected with another end of the second touch electrode serial and another end connected with the second pad via the second jumping wire.

19. The touch sensor of claim 15, wherein each of the first and second jumping wires includes a first width and a second width smaller than the first width, the first width being a width at a region where the first or second jumping wire does not cross over the first routing wires and the 2-1 routing wires, the second width being a width at a region where the first or second jumping wire crosses over the first routing wires and the 2-1 routing wires.

20. The touch sensor of claim 15, wherein the first ground wire is disposed between the outermost first routing wire and the innermost 2-1 routing wire.

21. The touch sensor of claim 20, wherein the innermost 2-1 routing wire surrounds the outermost first routing wire.

* * * * *